(12) United States Patent
Lenoble et al.

(10) Patent No.: US 7,526,990 B2
(45) Date of Patent: May 5, 2009

(54) CONTACT SAFETY DEVICE

(75) Inventors: Michel Lenoble, Bourges (FR); Michel Baubois, Bourges (FR)

(73) Assignee: CTA International, Bourges (FR)

( * ) Notice: Subject to any disclaimer, the term of this patent is extended or adjusted under 35 U.S.C. 154(b) by 184 days.

(21) Appl. No.: 11/598,793

(22) Filed: Nov. 14, 2006

(65) Prior Publication Data

US 2007/0137469 A1    Jun. 21, 2007

(30) Foreign Application Priority Data

Nov. 14, 2005    (FR) .................................... 05 11497

(51) Int. Cl.
*F41A 3/26*   (2006.01)
*F41A 3/72*   (2006.01)
*F41A 17/00*  (2006.01)

(52) U.S. Cl. .................... 89/18; 89/17; 89/180; 89/188; 42/70.01

(58) Field of Classification Search ............ 89/17, 89/18, 180, 181, 182, 184, 185, 188, 190; 42/70.01
See application file for complete search history.

(56) References Cited

U.S. PATENT DOCUMENTS

| 2,984,156 | A | * | 5/1961 | Edin et al. .............. 89/1.705 |
| 2,996,957 | A | * | 8/1961 | Evans ......................... 89/17 |
| 3,029,705 | A | * | 4/1962 | Broske ........................ 89/17 |
| 3,420,139 | A | * | 1/1969 | Bartels ........................ 89/17 |
| 4,550,641 | A | * | 11/1985 | Bruderer et al. .............. 89/12 |
| 5,886,281 | A | * | 3/1999 | Kirstein .................... 89/185 |
| 6,006,645 | A | * | 12/1999 | Breuer et al. ................ 89/24 |
| 6,186,041 | B1 | * | 2/2001 | Menges ........................ 89/24 |
| 6,978,709 | B2 | * | 12/2005 | Aalto et al. ................ 89/188 |
| 7,296,506 | B2 | * | 11/2007 | Lindblom .................... 89/22 |
| 2005/0011346 | A1 | * | 1/2005 | Wolff et al. ................ 89/12 |
| 2006/0065110 | A1 | * | 3/2006 | Ireland et al. ............... 89/17 |
| 2006/0185507 | A1 | * | 8/2006 | Trendall .................... 89/180 |

FOREIGN PATENT DOCUMENTS

FR    2 848 654    6/2004

* cited by examiner

*Primary Examiner*—Bret Hayes
(74) *Attorney, Agent, or Firm*—Oliff & Berridge, PLC

(57) ABSTRACT

A contact safety device between two mechanical parts mobile which respect to one another to guarantee the internal kinematics, by the release or activation of control means, wherein said device incorporates a safety unit connected to one of said two mechanical parts enclosing a probe activated by one of said two mechanical part and amplifying means constituted by an amplifying lever activated by said probe and an immobilizing lock activated by said amplifying lever meshed on said control means so as to transform a rectilinear micro-movement into a circular movement of large magnitude.

12 Claims, 6 Drawing Sheets

CONTACT SAFETY DEVICE

BACKGROUND OF THE INVENTION

1. Field of the Invention

The technical scope of the present invention is that of safety devices enabling the links between two mechanical parts to be verified.

2. Description of the Related Art

Taking into account the safety requirements in mechanisms presenting an immediate risk to the operators imposes the integration of a component functioning independently of the mechanisms in order to prevent it from continuing its action. This is the case, for example, for the linking of two mechanical parts at time (t) one of which is a drive part and the other driven. The pursuance of the drive action of one of the mechanical parts may prove very dangerous for an operator in charge of operating the mechanism. Thus, in the case of a weapon in which the barrel comes into contact with the breech ring, the perfect union of these two parts must be ensured for the drive shaft to be fully locked in rotation. This type of problem can be found in the stop commands of hydraulic, pneumatic, electric or mechanical power generators if the two parts remain at a distance of a few tenths of millimeters from one another thus presenting a risk to the users or the surroundings. It is thus necessary for a safety device to be designed which guarantees the mechanical locking in rotation of the drive shaft if the barrel is not in position on the breech ring, that is to say if there is even a very slight gap between them.

SUMMARY OF THE INVENTION

The aim of the present invention is to supply a contact safety device between two moving parts to guarantee they are perfectly linked and to prevent any transmission of movement when this contact is not ensured.

The invention thus relates to a contact safety device between two mechanical parts mobile which respect to one another to guarantee the internal kinematics, by the release or activation of control means, wherein it incorporates a safety unit connected to one of said part enclosing a probe activated by the mobile part and amplifying means constituted by an amplifying lever activated by the probe and an immobilizing lock activated by the amplifying lever meshed on the control means so as to transform a rectilinear micro-movement into a circular movement of large magnitude.

It is understood that the device according to the invention may be coupled with a manual control acting on the probe which can also ensure that the drive shaft is immobilized in a fraction of a revolution and be found in a first application for the rapid immobilization of cutting tools of the following types grinding wheels, blades, saw chains, drills, cutters, etc.

According to another characteristic of the invention, the probe is activated in translation and the lever and lock are activated in rotation.

According to yet another characteristic of the invention, the control means are represented by a hydraulic or pneumatic distributor, or electric switch.

According to yet another characteristic of the invention, the control means are represented by a drive shaft, the two mechanical parts being constituted by a gun barrel and a breech ring.

According to another characteristic of the invention, the safety unit is fixed to the breech ring near to the drive shaft.

Advantageously, the immobilizing lock is meshed onto a cam carried on the drive shaft.

According to yet another characteristic, the safety unit is in the form of a single-piece fitted with a first bore in which the probe slides and a second bore in which the amplifying lever and lock are inserted, both bores being positioned in substantially perpendicular directions.

Advantageously, the amplifying lever and lock are in contact with one another by a cam to ensure their rotation each around a pin fixed on the safety unit.

Advantageously again, the probe and the lock are subjected to the action of return means.

Advantageously again, the immobilizing lock presses on an adjustable limit stop.

Advantageously again, the amplifying lever pivots around a pin that can be adjusted by the eccentric.

A first advantage of the device according to the invention lies in the guarantee that a mechanism which puts an operator in danger is prevented from functioning if the two parts are not correctly assembled.

Another advantage lies in the possibility of fully immobilizing the control means if the mobile part is not brought into its nominal functioning position.

Another advantage lies in the fact that the lock ensures the immobilizing in rotation of the drive shaft until such time as the lock has fully rotated.

BRIEF DESCRIPTION OF THE DRAWINGS

Other characteristics, particulars and advantages of the invention will become more apparent from the description given hereafter by way of illustration and with reference to the appended drawings, in which.

DETAILED DESCRIPTION OF PREFERRED EMBODIMENTS

In the following description, a particular application of the invention will be described in which the safety unit guarantees contact between two mechanical parts by the immobilizing or not of a drive shaft. It goes without saying that the device according to the invention may be implemented so as to control any mechanical part, to activate an electric switch, to make an electrical contact between two parts, and more generally to generate a control to as to allow or prevent the transmission of a command. The control means may therefore be represented by a hydraulic or pneumatic distributor, or an electrical switch.

Figure 1:
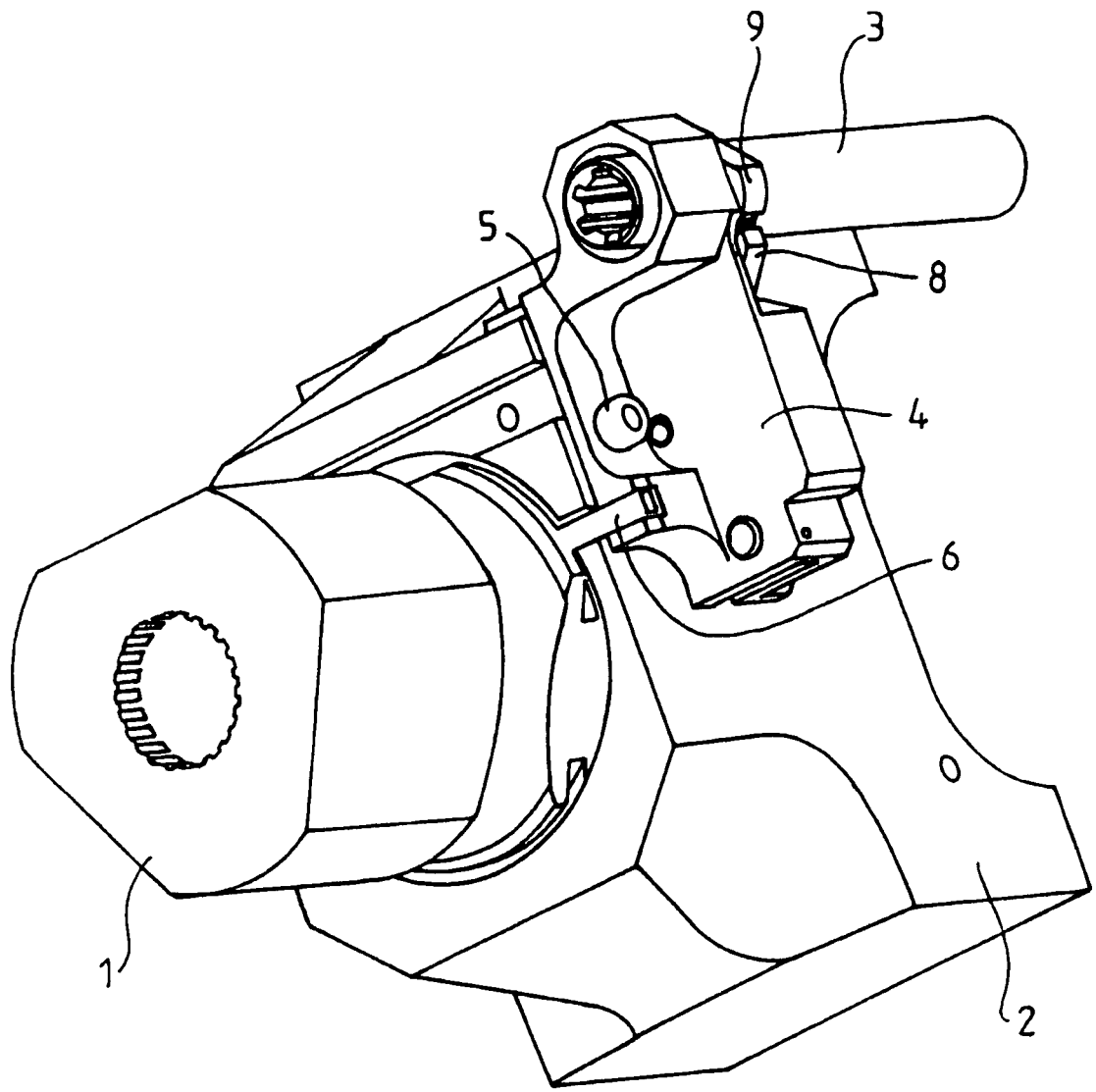
FIG. 1 shows a view of two mechanical parts intended to be assembled.

FIG. 1 is a perspective view of a partially shown gun barrel 1 and breech ring 2 coming into contact with one another during firing sessions. It is understood that full contact between these two parts must be ensured to avoid any gas leakage causing a risk to an operator located nearby. When the contact between the two parts is not perfect, the following sequence must be interrupted by immobilizing a drive shaft 3 fixed onto the breech ring. To this end, the contact safety device incorporates a safety unit 4 here connected to the breech by appropriate means, screws 5, for example. This unit 4 encloses a probe 6 activated in translation by the barrel 1 and amplifying means constituted by an amplifying lever 7 (not shown in this Figure) activated by the probe 6 and an immobilizing lock 8 activated by the amplifying lever meshed with the drive shaft 3 carrying a ratchet wheel 9. This structure is provided to guarantee the internal kinematics by releasing or activating the control means by transforming a rectilinear micro-movement of the probe 6 into a circular movement of great magnitude, as will be explained hereafter.

Figure 2:
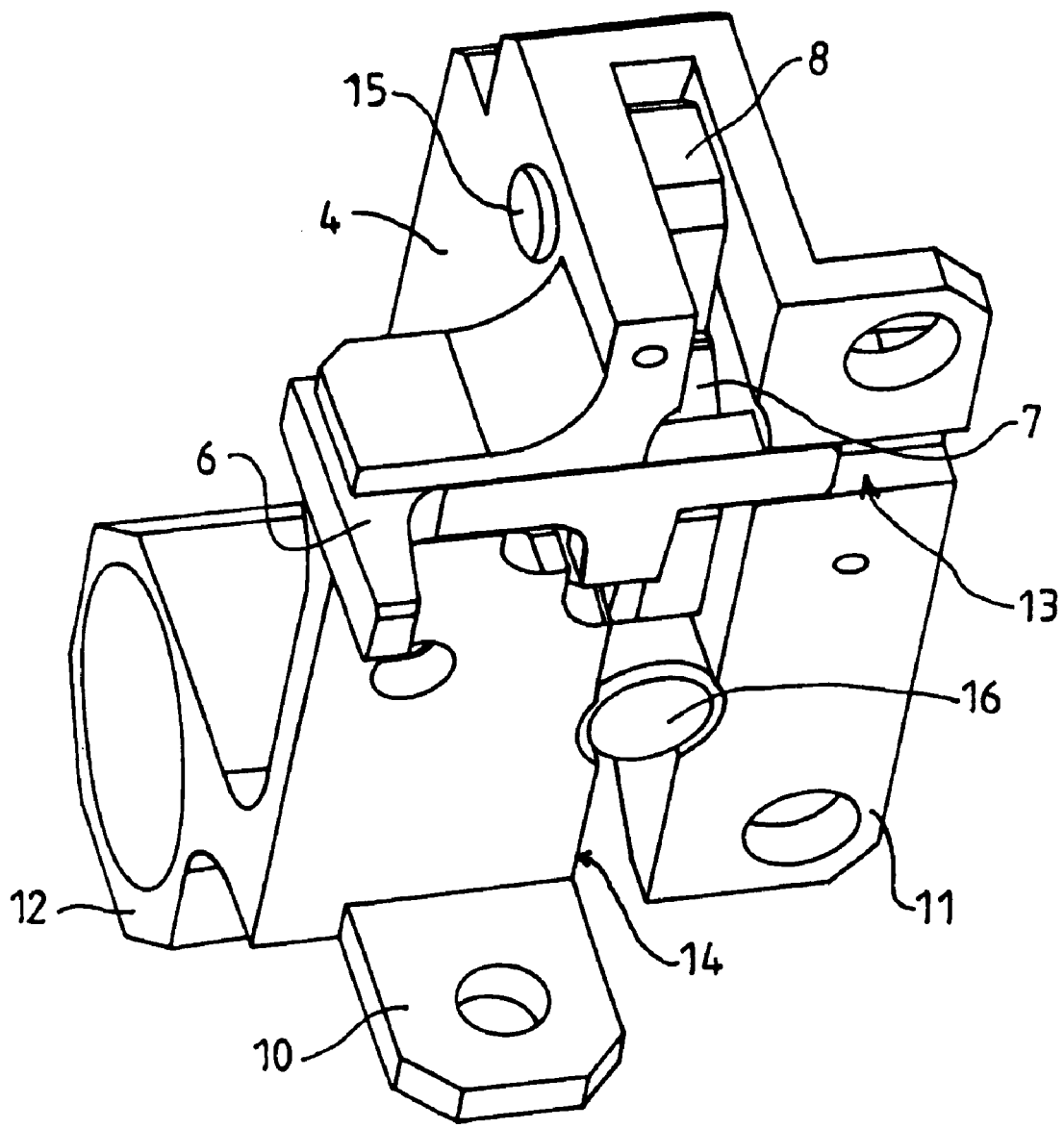
FIGS. 2 and 3 show a view of the safety unit with its mechanism.

The perspective view in FIG. 2 shows the safety unit 4 in the form of a machined piece provided with brackets 10 and 11 to fasten it to the breech ring 2 using screws. The unit 4 in addition incorporates a fork joint 12 to accommodate the drive shaft 3.

The unit 4 incorporates a first bore 13 in which the probe 6 is inserted for any movements in translation, such bore being made in agreement with the configuration of the probe. This bore 13 is made in the direction of movement of the mobile part 1. A second bore 14 is provided in the unit 4 in which the amplifying lever 7 and lock 8 are inserted. The lock 8 is fastened by means of the transversal pin 15 around which it is able to pivot and the position of this lever can be adjusted by means of a limit stop 16 screwed into the unit 4.

Note that in the Figure, the two bores 13 and 14 are arranged in perpendicular directions.

Figure 3:
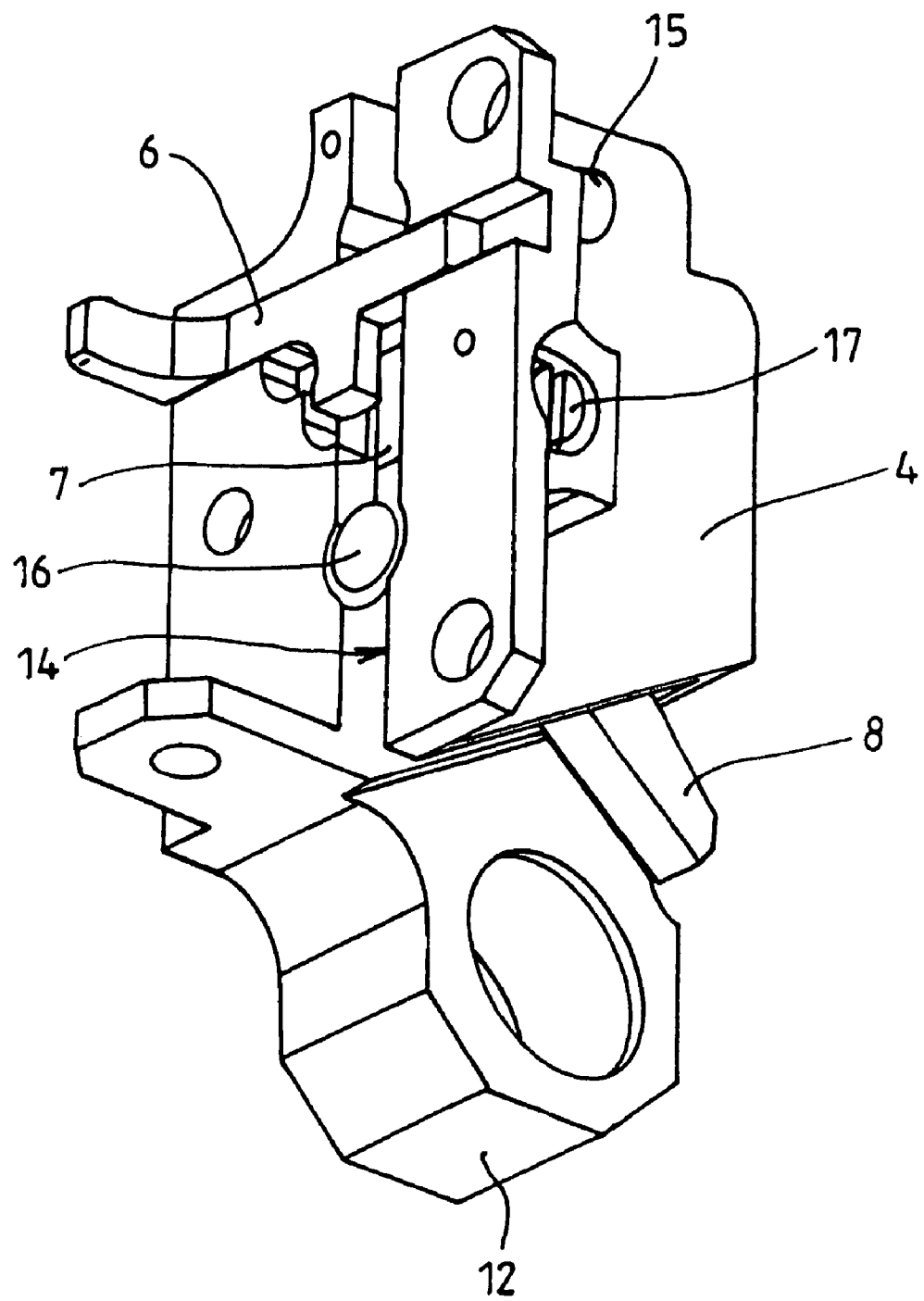

FIG. 3 shows the same elements as in FIG. 2. This FIG. 3 shows the fastening of the amplifying lever 7 by means of the pin 17 and shows that the lower end of the lock 8 protrudes near to the fork joint 12.

Figure 4:
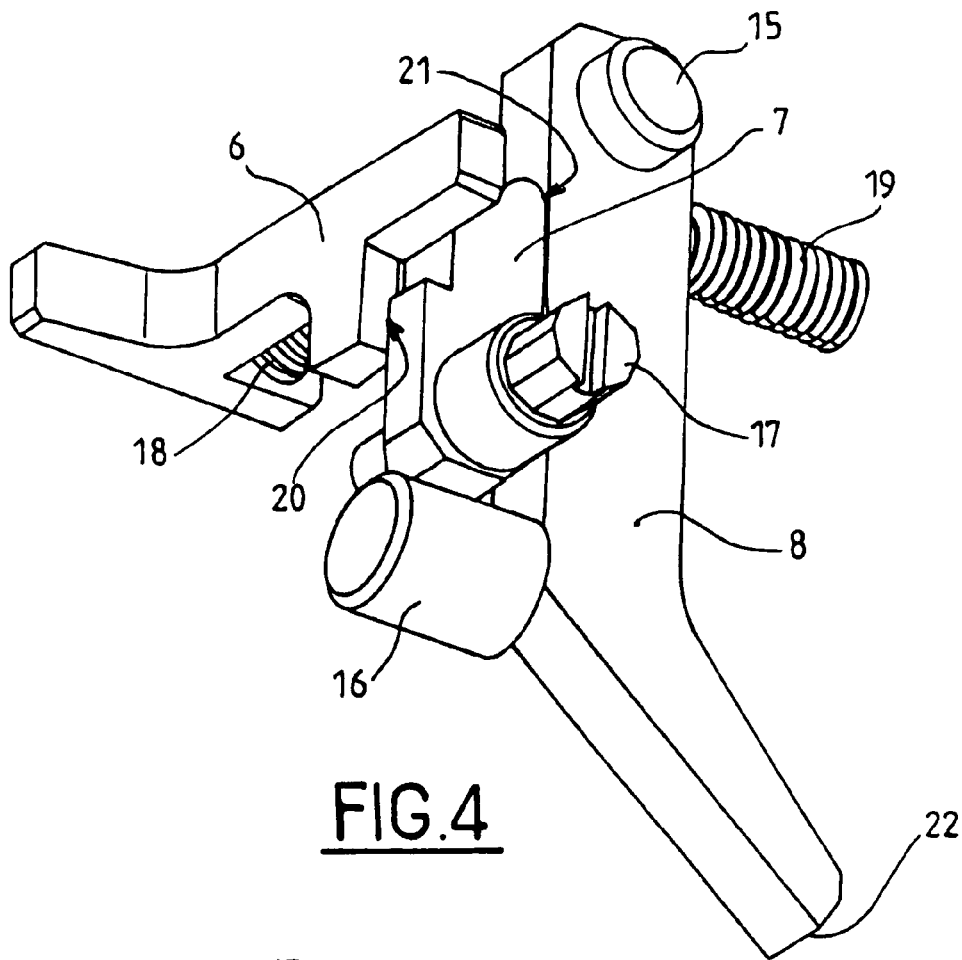
FIGS. 4 and 5 show perspective views of the safety mechanism in its assembled position.
Figure 5:
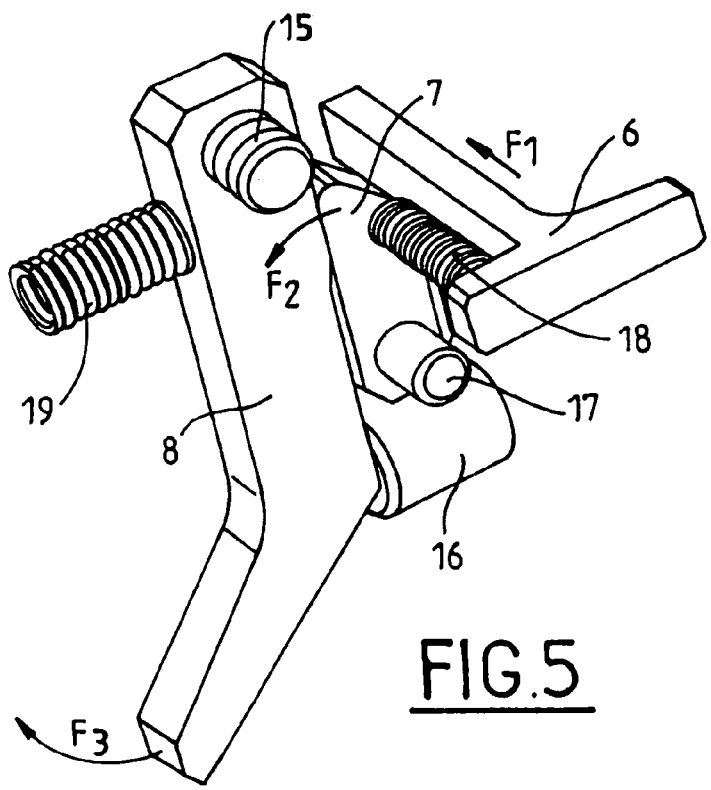

FIGS. 4 and 5 enable the spatial arrangement of the probe 6, the amplifying lever 7 and the lock 8 to be illustrated. We can see that the probe is subjected to the action of a return spring 18 arranged between one wing of the probe and the safety unit 4. This spring guarantees that the probe is held in constant contact with the safety unit, in the absence of any external stress on the probe. Similarly, the lock 8 is subjected to the action of a return spring 19 pressing on the unit 4 to guarantee constant contact between this lock and the lever and able to constantly bring back the lock against the limit stop 16. The probe 6 and lever 7 are in mutual contact along a bearing surface 20 so that the translation of the probe 6 generates a rotation of the lever around pin 17. The lever 7 and lock 8 are also in mutual contact along a bearing surface 21 so that the rotation of the lever causes the lock to rotate around pin 15 against the action of the spring 19.

FIG. 5 shows the respective movements of the different parts of unit 4. When the probe 6 is activated in translation following arrow F1 under the action of the mobile part, it causes the lever 7 to rotate following arrow F2. This rotation is accompanied by a pressure of the lever 7 on the lock 8 which is thereafter driven in rotation following arrow F3. It has been calculated that the translation of the probe drives a displacement of the lock of at least 20 times with respect to the distance traveled by the probe.

We can see that the immobilization of the shaft 3 is ensured as soon as the barrel 1 is at a distance of a few tens of mm from the breech ring 2 or is completely absent. However, the circular movement of the lock enables the gullet tooth to be disengaged from the ratchet wheel of the drive shaft.

Figure 6:
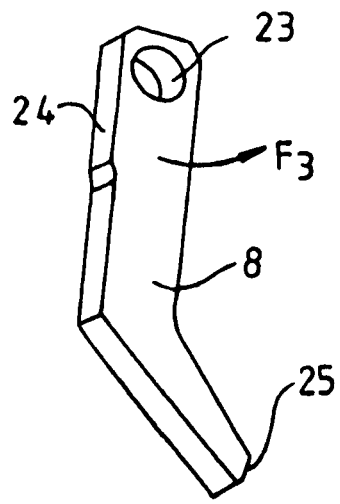
FIG. 6 shows the immobilizing lock.

FIG. 6 shows the lock 8 in the shape of an open L, one branch of which is provided with an opening 23 to receive pin 15 and a surface 24, and the other branch is finished off by a gullet tooth 25 intended to cooperate with the drive shaft.

The lock may also integrate a support in place of or in addition to the gullet tooth. This support is intended to control either a hydraulic or pneumatic distributor, or an electric switch.

Figure 7:
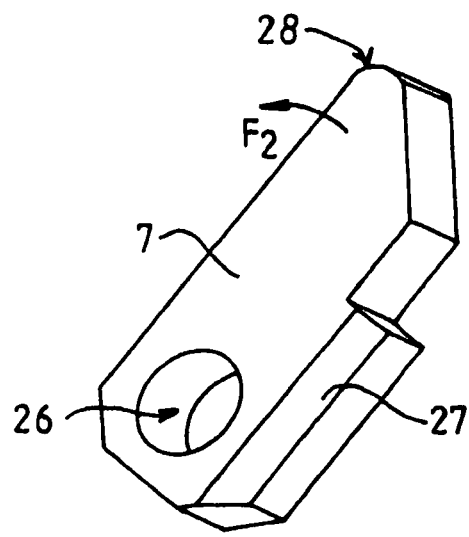
FIG. 7 shows the amplifying lever.

FIG. 7 shows the amplifying lever 7 provided with an opening 26 to accommodate pin 17 and an inclined surface 27. Pin 17 has an eccentric enabling the position of the opening 26 of the amplifying lever to be modified in the safety unit. This displacement thus enables the lever's path of rotation to be modified and thus the amplification ratio of the lock's movement. Lastly, the amplifying lever 7 pivots on a pin that can be adjusted thanks to the eccentric integrated onto pin 17.

Figure 8:
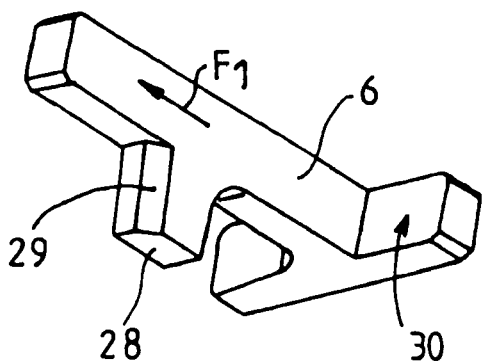
FIG. 8 shows the probe.

FIG. 8 shows the probe 6 in the shape of a T, one branch of which is provided with a finger 28 with a surface 29. The crossbar of the T incorporates a bearing surface 30 for its spring 19.

Together with the probe, the lever and the lock, the unit 4 constitutes a single-piece assembly of high stiffness able to dissipate in the lock the kinetic energy amassed in the drive shaft 3 during its immobilization. The lock, shown as a single-piece and thus with high stiffness, can be replaced by an assembly of three components: the lock, the energy dissipating spring (which could be in the form of an elastomer) and the body of the lock. This sub-assembly, which enables the lock to slide without force in the lock body, enables the energy supplied by the drive shaft when being immobilized to be dissipated.

The device functions as follows. When the probe 6 is activated in translation by the part 1 against the action of the spring 18, the surface 29 of the finger 28 comes into contact with the surface 27 of the lever 7. This action of the probe generates a slippage of surface 29 on surface 27 causing the lever 7 to rotate around pin 17. The rotation of the lever 7 brings its surface 28 into contact with surface 24 of the lock 8. The lock 8 is thereafter activated in rotation by a substantial amount enabling the gullet tooth 25 to be disengaged from the drive shaft. It is understood that this substantial displacement can be used to control an electric switch or ensure any other control of any other mechanism.

Figure 9:
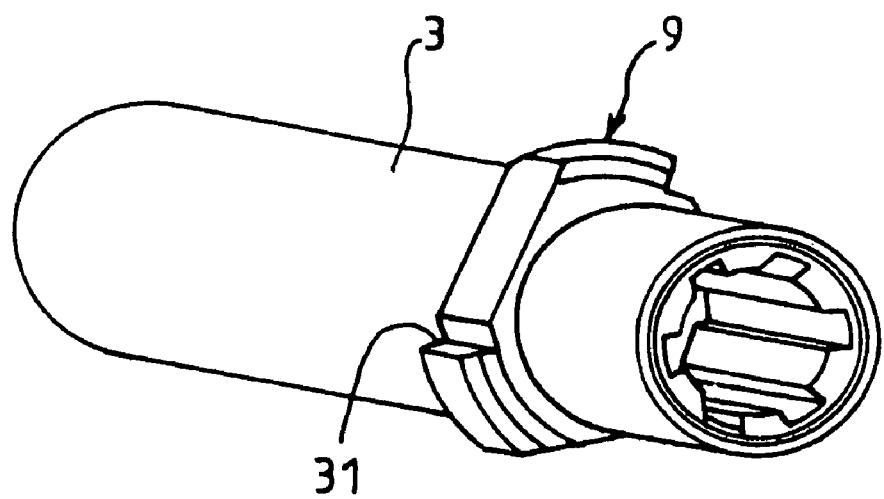
FIG. 9 shows a view of the drive shaft.
Figure 10:
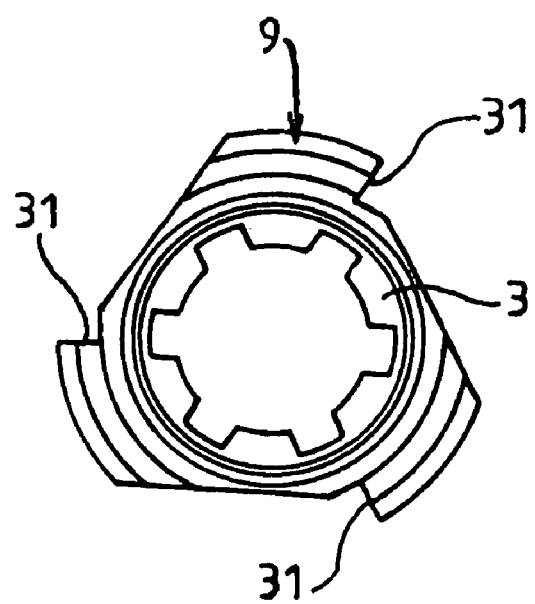
FIG. 10 is a section view showing the ratchet wheel carried on the drive shaft.

FIGS. 9 and 10 show the drive shaft 3 provided with the ratchet wheel 9 delimiting cams 31 onto which the lock 8 presses thereby preventing any rotation of the drive shaft 3. Thanks to the translation of the probe 6 and the successive rotations of the lever 7 and lock 8, the gullet tooth is retracted with respect to a cam, releasing the drive shaft 3. Thus, until the lock 8 has fully rotated, the shaft 3 is prevented from rotating and no transmission of movement is performed, thereby rendering the device reliable and free from malfunctions.

The manual control is a so-called dead-man's release control since it corresponds to the additional mechanisms of imposing a constant manual pressure (push button, for example) for which the release of pressure causes the push button to return to its starting position and the probe to translate under the action of its spring. The immobilization of the drive shaft's rotation by the lock is thus guaranteed as soon as the manual action on the push button ceases.

What is claimed is:

1. A contact safety device between two mechanical parts moveable relative to one another, the safety device comprising:

safety unit connected to one of the mechanical parts;

a probe enclosed by the safety unit and configured to be activated by one of the mechanical parts;

an immobilizing lock configured to engage or disengage a control means, the control means structured to control the movement of the mechanical parts relative to one another; and an amplifying lever configured to be activated by the probe, the lever configured to transform a rectilinear movement of the probe into a circular movement of the lock, and the circular movement of the lock being greater than the rectilinear movement of the probe.

2. The contact safety device according to claim 1, wherein:
the probe is activated by one of the mechanical parts causing the probe to move in translation;
the lever is activated by the probe contacting the lever to cause the lever to rotate; and
the lock is activated by the lever contacting the lock to cause the lock to rotate.

3. The contact safety device according to claim 1, wherein the control means comprises a hydraulic distributer, a pneumatic distributer, or an electric switch.

4. The contact safety device according to claim 1, wherein:
the control means comprises a drive shaft; and
the mechanical parts comprise a gun barrel and a breech ring.

5. The contact safety device according to claim 4, wherein the safety unit is fixed to the breech ring and surrounds to the drive shaft.

6. The contact safety device according to claim 5, wherein the lock is configured to engage with a cam carried on the drive shaft.

7. The contact safety device according to claim 5, wherein the safety unit is in the form of a single-piece and comprises:
a first bore in which the probe slides; and
a second bore in which the lever and lock are inserted, the second bore being positioned in a substantially perpendicular direction to the first bore.

8. The safety device according to claim 7, further comprising:
a first pin fixed on the safety unit, the lever being rotatable about the first pin; and
a second pin fixed on the safety unit, the lock being rotatable about the second pin;
wherein the lever is in the form of a cam that contacts the lock, the rotation of the lever around the first pin while contacting the lock causing the rotation of the lock around the second pin.

9. The contact safety device according to claim 6, wherein the safety unit is in the form of a single-piece and comprises:
a first bore in which the probe slides; and
a second bore in which the lever and lock are inserted, the second bore being positioned in substantially perpendicular direction to the first bore.

10. The safety device according to claim 4, further comprising:
a first return means that engages the probe; and
a second return means that engages the lock.

11. The safety device according to claim 10, wherein:
the first return means comprises a spring; and
the second return means comprises a spring.

12. The safety device according to claim 4, further comprising an adjustable limit stop, the lock pressing on the adjustable limit stop when the lever has not caused the rotation of the lock.

* * * * *